United States Patent [19]

Tuson

[11] 4,206,782

[45] Jun. 10, 1980

[54] EQUIPMENT FOR CONNECTING OIL-TANKERS TO MARINE TOWERS

[75] Inventor: Samuel Tuson, Mesnil-le-Roi, France

[73] Assignee: Enterprise d'Equipments Mecaniques et Hydraulics E.M.H., France.

[21] Appl. No.: 841,483

[22] Filed: Oct. 12, 1977

[30] Foreign Application Priority Data

Oct. 19, 1976 [FR] France ................................ 76 31432

[51] Int. Cl.[2] ................................................ F16L 3/00

[52] U.S. Cl. .................................... 137/615; 141/388; 137/355.26

[58] Field of Search ............... 141/388, 387, 279, 284; 137/615, 355.16, 355.26, 355.27

[56] References Cited

U.S. PATENT DOCUMENTS

| | | | |
|---|---|---|---|
| 3,199,553 | 8/1965 | Garnett et al. | 137/615 |
| 3,249,121 | 5/1966 | Bily | 141/388 |
| 3,583,445 | 6/1971 | Harbonn et al. | 141/388 |
| 3,654,951 | 4/1972 | Pogonowski et al. | 137/355.16 |
| 3,712,330 | 1/1973 | Davis | 137/615 |
| 3,742,536 | 7/1973 | Sada et al. | 141/388 |
| 3,913,157 | 10/1975 | Versluis et al. | 141/388 |
| 3,921,557 | 11/1975 | Kapteijn | 141/387 |
| 3,980,037 | 9/1976 | Tuson | 141/388 |
| 4,023,517 | 5/1977 | Ryan | 141/388 |
| 4,121,616 | 10/1978 | Lochte et al. | 137/615 |

FOREIGN PATENT DOCUMENTS

| | | |
|---|---|---|
| 955013 | 12/1956 | Fed. Rep. of Germany . |
| 2067173 | 11/1969 | France . |
| 2272888 | 2/1975 | France . |

*Primary Examiner*—Martin P. Schwadron
*Assistant Examiner*—A. Michael Chambers
*Attorney, Agent, or Firm*—Steinberg & Blake

[57] ABSTRACT

Apparatus for connecting a tanker to a marine tower comprising apparatus for mooring the tanker to the tower and apparatus for connecting a supply conduit on the tower to a receiver conduit on the tanker. A hose-pipe section is normally stored on the tanker at least in part on a rotary pulley located on the tanker in a manner such that one of the ends of the hose-pipe has connected to it a first connecting element which opens upwardly on the tanker deck. A boom on the tower capable of freely pivoting about the axis of the latter has attached to its free end a second connecting element adapted to cooperate with the first connecting element. A rope passes vertically through the second connecting element whose free end is attachable to the first connecting element to move the first connecting element towards or away from said second connecting element which remains substantially stationary.

16 Claims, 10 Drawing Figures

EQUIPMENT FOR CONNECTING OIL-TANKERS TO MARINE TOWERS

BACKGROUND OF THE INVENTION

The present invention relates to apparatus for connecting petroleum transport vessels or oil-tankers to marine towers, columns or marine buoys with which are associated means for supplying oil or any other hydrocarbon compound. The connection operation includes, on the one hand, mooring the vessel to the tower and, on the other hand, connecting a supply conduit or line provided on the tower to a receiver conduit mounted on the vessel for transferring the hydrocarbon compound from the tower to the vessel.

In certain conventional embodiments of such apparatus, the connection is effected by means of a hose-pipe portion which is permanently suspended from the end of a boom provided on the tower.

Such conventional apparatus provide certain advantages. However, the hose-pipe portions employed in such apparatus, which frequently have diameters which exceed 40 cm, as well as the connecting components utilized, are "consumable" members, i.e. members which are relatively easily broken or damaged by exposure to adverse weather conditions, such for example as wind, rain, sea water and the like.

The invention provides a solution which enables the exposure of such portions, referred to herein as "hose-pipes", to be avoided while at the same time considerably simplifying the apparatus and the operating steps necessary to accomplish the desired mooring and connection.

SUMMARY OF THE INVENTION

The connecting apparatus according to the invention, like the conventional apparatus described above, includes a connecting hose-pipe which is normally stored on the vessel in a manner known per se. Further, according to the invention, a rotary pulley, preferably a single-turn rotary pulley, is mounted on the vessel which is adapted to receive, at least partially, the hose-pipe in a manner such that one of the ends of the latter, which is provided with a first connecting element, opens upwardly on the deck of the vessel even while the hose-pipe is in its stored position and wherein the other end of the hose-pipe is connected permanently to the hydrocarbon receiving conduit on the vessel.

A boom is mounted on the tower in a manner known per se so as to be freely pivotable on the tower about the substantially stationary axis of the latter under the action of the mooring forces exerted thereon by the moored vessel. A second connecting element is provided which is adapted to automatically cooperate with the first connecting element so that their mutual connection and disconnection are ensured simply by their relative axial motions toward and away from each other, respectively. The second connecting element is mounted at the end of the boom on the downstream end of the hydrocarbon supply conduit provided on the tower in such a manner such that its outlet opening is directed downwardly.

A rope or other flexible member passes vertically through the second connecting element and is adapted to be attached to the first connecting element to vertically move the same toward or away from the second connecting element. Thus, one end of the rope is attached to an actuating winch provided on the tower whereas its other free end is suspended from the end of the boom.

Various embodiments of the invention are disclosed herein. Thus, in one embodiment the pulley is adapted to be rotatable about a stationary axis and one end of the hose-pipe is connected to the receiver conduit through at least one rotary joint which is coaxial with the pulley, the latter being preferably resiliently urged angularly in the direction of winding of the hose-pipe thereon. In another embodiment the pulley is mounted as a simple idler or mule pulley so as to support a portion of the hose-pipe which extends along an arc of the order of 180 degrees between an upstream rectilinear length and a downstream rectilinear length. In this embodiment, apparatus is provided to resiliently displace the pulley along a path which extends radially with respect to the axis of the pulley along the bisectrix of the angle formed by the medial line of the two hose-pipe lengths. The other end of the hose-pipe, namely the downstream end of the downstream length, is connected to the receiver conduit through a fixed member of the vessel.

The second connecting element comprises an obturating member through which the rope passes vertically and which is urged by its own weight towards a lower position in which it obturates the downstream end of the distributing conduit of the tower. The connection between the two connecting elements is effected by attaching the free end of the rope to the first connecting element whereupon an upward pull is exerted on the rope so that the obturating member is lifted and thus automatically moved from its obturating position. The second connecting element in this embodiment comprises a rotor chamber which opens annularly towards its center and which communicates with the downstream end of the supply conduit of the tower. The first connecting element comprises a cylindrical body with a radially extending aperture adapted to cooperate with the annular opening and the obturating member is provided with a cylindrical sleeve with solid walls adapted to be urged against the edges of the annular opening with sealing means interposed therebetween.

According to an embodiment of the invention the axis of the pulley may be horizontal, in which case the pulley is accommodated within the vessel prow mounted on a cradle erected on the deck of the vessel. In another embodiment, the axis of the pulley is vertical and a guide is provided at the prow of the vessel which is bent in order to direct the hose-pipe upwardly, even while the hose-pipe is in its stored position with the first connecting element being provided on the end of the hose pipe.

The connecting equipment also comprises a mooring hawser normally stored on the tower, one end of which is adapted to be connected to the vessel and which is connected to the end of the rope which is suspended from the end of the boom prior to the mooring operation.

In the apparatus described above, the end of the hawser which is to be connected to the vessel is provided with an eye. A cable is provided which passes through the eye, one end of which is attached to an actuating winch provided on the tower while its other end is connected to a float, itself preferably associated with a remotely controlled thruster. The cable has a bulging portion which is too large to pass through the eye. The length of the cable defined between the float and the bulge is greater than the maximum distance between the tower and the vessel at the beginning of the mooring operations.

In addition to the above elements, the apparatus of the present invention comprises certain other arrangements which are preferably used simultaneously and which will be referred to more explicitly below.

DESCRIPTION OF THE DRAWINGS

Several preferred embodiments of the invention will be described in the following with reference to the appended drawings which, of course, are non-limitative.

DETAILED DESCRIPTION OF THE PREFERRED EMBODIMENT

Figure 1:
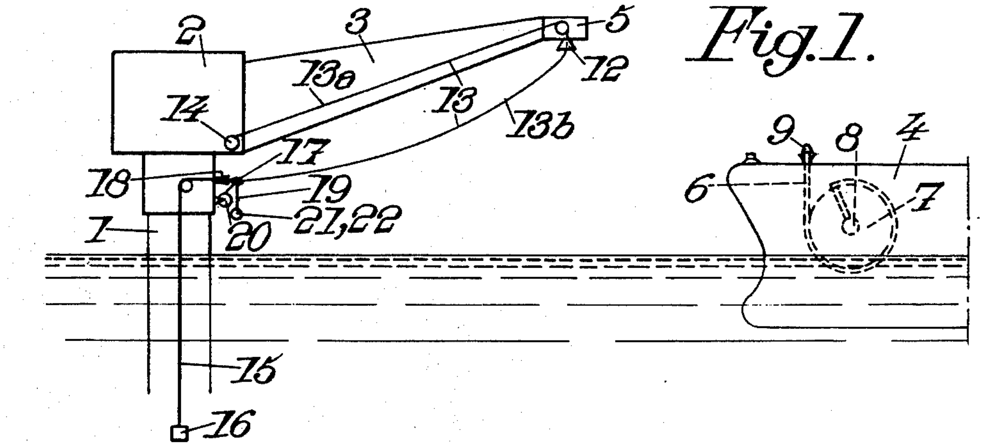
FIGS. 1 to 4 illustrate diagrammatically four successive stages of operation, respectively, of apparatus according to the invention for connecting an oil-tanker to a marine tower.
Figure 2:
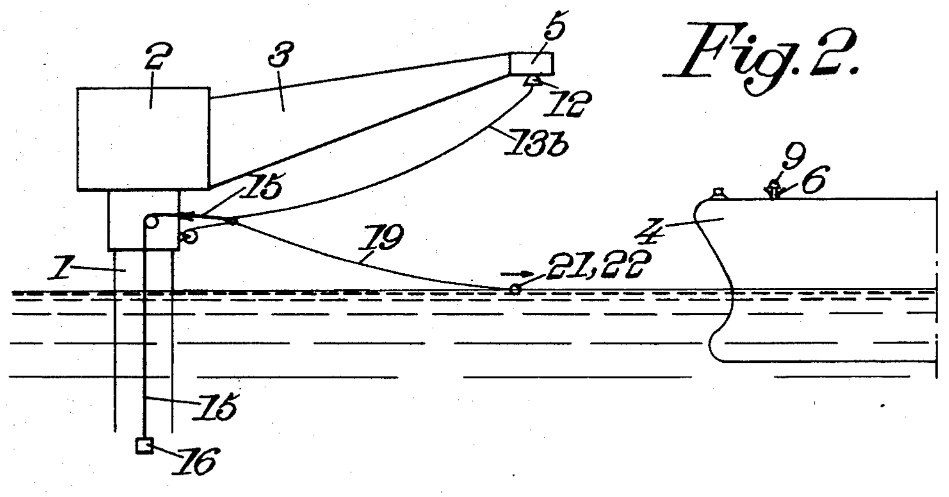
Figure 3:
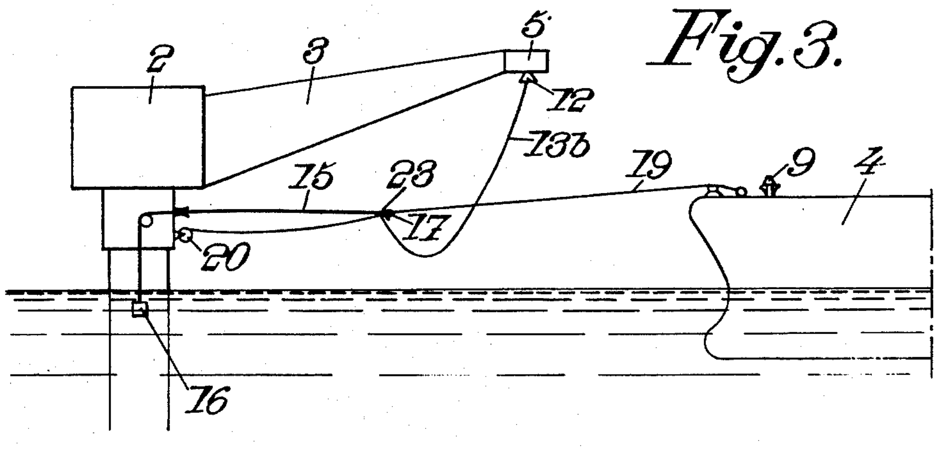

Generally designated in the drawings by reference numeral 1 is a tower or buoy anchored to the sea bed or ocean floor, preferably in such a manner as to allow for only slight inclinations or oscillations of the tower under the action of the wind and the sea streams, for which purpose the tower or column is advantageously articulated by means of a universal or a Cardan joint.

The tower 1 carries a head 2 preferably surmounted by a helicopter landing platform. A boom 3 extends radially from the head horizontally or slightly upwardly inclined to the horizontal. The head is moreover mounted on the tower so as to be capable of free rotation about the vertical axis of the latter under the action of the forces exerted thereon by an oil-tanker 4 moored thereto.

In a manner known per se, the tower 1 includes a hydrocarbon supply means and, in particular, a supply conduit or line whose downstream end is located at the end 5 of the boom 3.

The vessel 4 is equipped with a hydrocarbon receiver conduit allowing the liquid received to be transferred to the various tanks provided therefor.

The present invention provides apparatus for interconnecting the supply and receives conduits in order to load the hydrocarbon transport vessel.

To this end, a connecting hose-pipe length 6 is normally stored on the vessel by being wound at least partially on a rotary pulley 7 mounted on the vessel. In this manner, the hose-pipe length is protected from adverse weather conditions which normally act on hose-pipe lengths which are conventionally permanently suspended from the boom end and which therefore are normally subject to damage and frequent replacement.

One of the ends of the hose-pipe 6 remains permanently connected to the hydrocarbon receiver conduit on the vessel, whereas its other end, provided with a first connecting element 9, opens upwardly onto the deck of the vessel even in the stored position of the hose-pipe.

The axis or shaft of the pulley 7 may be either stationary or movable in the radial direction. The latter case will be described later with reference to FIGS. 8 and 9. In the embodiments illustrated in FIGS. 1–7, the pulley axis or shaft is stationary and the pulley is used for storing the hose-pipe 6 by winding the latter onto the pulley and the permanent connection to the receiver conduit is ensured through a rotary joint 8 which is coaxial with the shaft of the pulley.

Figures 4, 5, 6, 7, 10:
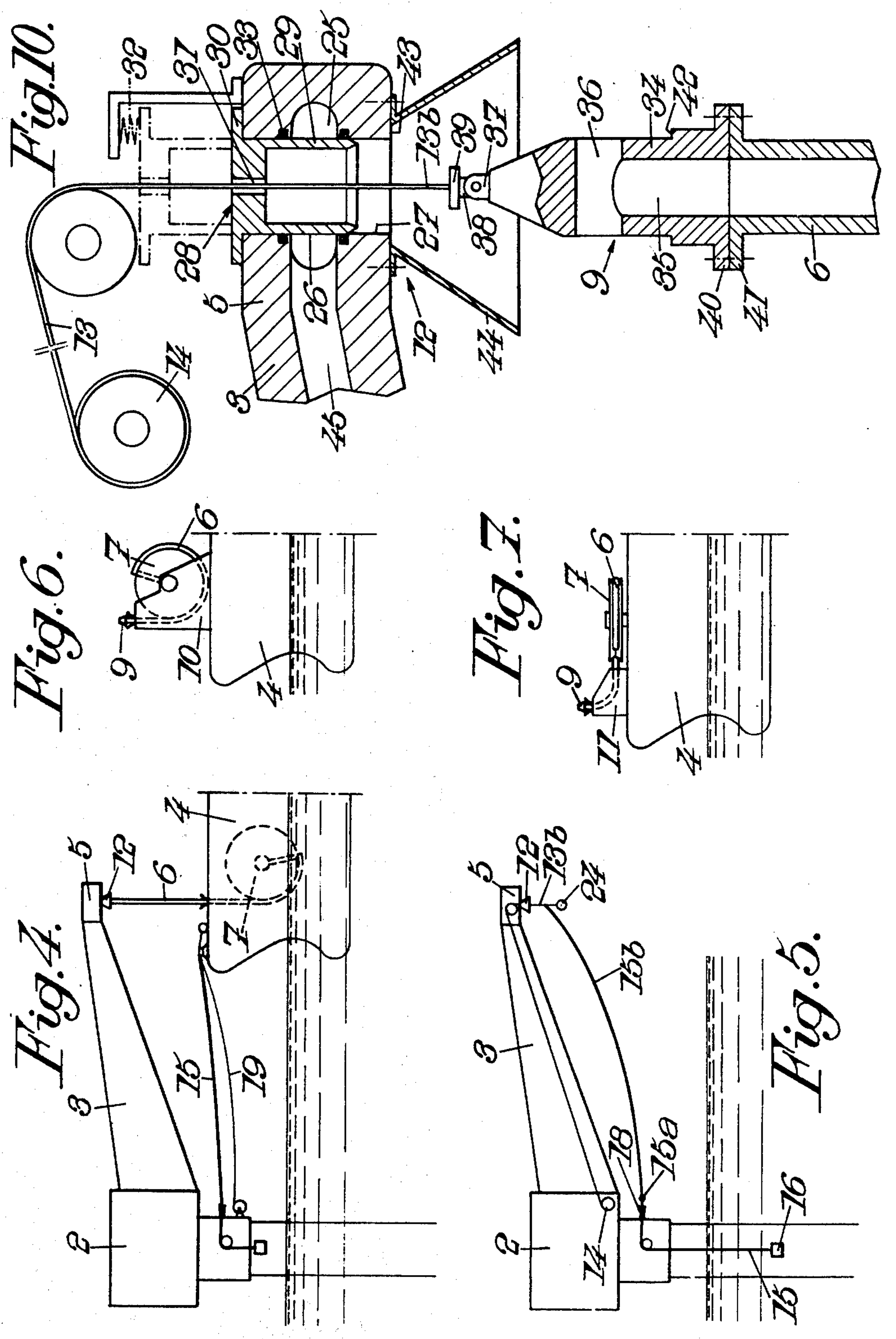
FIG. 5 similarly shows a simplified embodiment of the portion of such connecting apparatus which is mounted on the tower.
FIGS. 6 and 7 similarly illustrate two specific embodiments of the portion of the connecting apparatus which is mounted on the vessel.
FIG. 10 shows in more detail a form of embodiment of two connecting elements comprised in such an equipment.

This stationary axis of pulley 7 may be horizontal, in which case the pulley may be either accommodated in an appropriate space reserved for this purpose in the prow of the vessel (FIGS. 1 to 5), or mounted on a cradle 10, the latter being erected on the deck of the vessel (FIG. 6).

The stationary pulley shaft or axis may also be vertically arranged, in which case the vertically and upwardly directed end of the hose-pipe 6 is connected to the wound portion of the latter through a bent guide 11 (FIG. 7), with a generally right-angled bend having a sufficient radius, generally greater than 3 m.

The pulley 7 is preferably sufficiently large in diameter (e.g of the order of 10 m) in order that the winding of the hose-pipe 6 thereof will not exceed a single turn.

In this manner various drawbacks of conventional apparatus are avoided. For example, mutual overlapping of the turns of the hose-pipes, which may result in problems in the region of the connecting members since the latter generally comprise flanges or other radial projections is avoided. Further, torsional forces exerted on the shaft of the pulley when the latter comprises several turns wound side by side are eliminated.

In certain cases, however, use can be made of a pulley having a smaller diameter, despite the fact that such would result in the hose-pipe being wound over a little more than a turn, for example over two turns, either extending helically, side by side, or superposed.

The pulley 7 is urged angularly about its axis to a slight extent by resilient means in the direction tending to wind the hose-pipe thereon. The advantages of this arrangement are described below.

As mentioned above, instead of the pulley having hose-pipe wound thereon, the pulley may be mounted as an idler or mule pulley for storing the hose-pipe on the vessel in a manner so as to form two parallel or substantially parallel hose-pipe lengths interconnected by an arcuate elbow portion engaged on the pulley along an arc of the order of 180 degrees. In this case the axis or shaft of the pulley is preferably permanently urged radially by resilient means in a direction such that both lengths of the hose-pipes are maintained in tension. At the same time, this ensures a great flexibility in the pull of the upstream length towards the tower so as to compensate for the variations of the distance between the vessel and the tower during the loading of the former with hydrocarbon.

Figure 8:
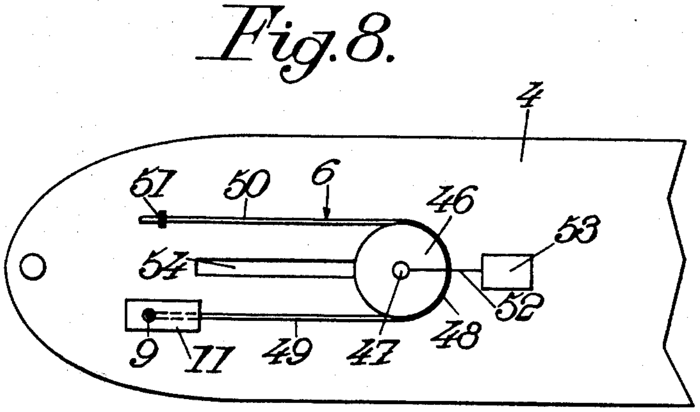
FIGS. 8 and 9 are diagrammatic top views of still another modification of the portion of a connecting apparatus which is mounted on the vessel.
Figure 9:
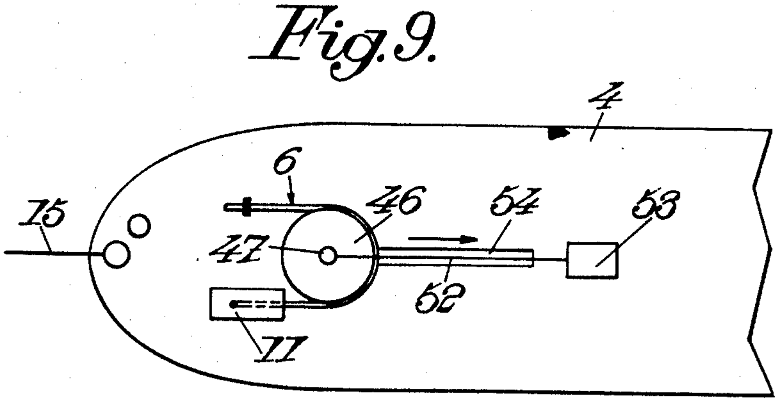

This particular embodiment is illustrated in FIGS. 8 and 9, wherein the idler or mule pulley is designated by reference numeral 46 and has a vertical shaft 47.

The hose-pipe 6 comprises an arcuate length 48 wound over about 180 degrees of the pulley and which is connected to two rectilinear, mutually parallel lengths, namely an upstream length 49 and a downstream length 50, respectively. The upstream end of the upstream length 49 on which the connecting member 9 is provided is directed upwardly by means of a guiding elbow 11 similar to that of FIG. 7, whereas the downstream end of the downstream length 50 is connected at a fixed point 51 to the hydrocarbon receiver conduit on the vessel.

The pulley shaft 47 is pulled by a tie 52 wound on a suitable winch 53 so as to be displaced radially along a tow-path 54 so as to flexibly maintain both lengths 49 and 50 of the hose-pipe in tension.

Of course, a similar arrangement may be utilized with the shaft 47 of the pulley 46 in a horizontal position.

Further, in a similar manner, at least a second idler or mule pulley may be used in association with the pulley 46 in order, for example, to reduce the total space occupied by the equipment and/or the magnitude of the resilient return force applied by the tie 52. Two pullies may be combined to constitute a kind of pulley block.

The downstream end of the hydrocarbon supply conduit mounted on the tower is connected to a second connecting element 12 complementary to the first element 9 and adapted to automatically cooperate with the latter so as to establish a fluid-tight connection between this conduit and the hose-pipe 6.

The automatic cooperation between the two connecting elements 9 and 12 is such that the mutual connections and disconnections of these two elements are effected by simply moving them axially either towards or away from each other, respectively. An advantageous form of embodiment of the connecting element is described below with reference to FIG. 10.

To effect the relative displacements between the two connecting elements 9 and 12, the connecting element 9 is moved vertically. To this end use is made of a rope 13 which passes vertically through the connecting element 12. One end 13*a* of rope 13 is attached to a remote-controlled winch 14 mounted on the head 2. The other or free end 13*b* of rope 13 in normal conditions, i.e. in the absence of connection between the tower and the vessel, remains suspended from the end 5 of the boom.

The mooring proper of the vessel 4 to the tower 1 can be effected in several different manners, two of which will now be described.

In each of the two cases disclosed, the mooring is accomplished exclusively from the vessel, i.e. without requiring the assistance of a crew on the tower itself.

The first method of mooring does not require the vessel to closely approach the tower before the beginning of the mooring operation. Thus, the distance between the tower and the vessel may still be of the order of 200 m when the operations are started.

In this case a mooring hawser 15 is normally stored in the tower by being wound on a drum carried by the latter or, preferably, by being kept in tension vertically within the tower by a balance or counter-weight 16 in accordance with French Pat. No. 74 04 643 of Feb. 12, 1974. This hawser 15 terminates outside of the tower with a closed loop 17 (or with a ring) issuing from a trumpet or similar flared pipe 18 or any other suitable device (such as a set of guiding rollers) capable of keeping the said loop outside the tower.

The end 13*b* of the rope 13 is attached to the loop 17.

Moreover, a light cable 19 is wound around a remote-controlled winch 20 which is carried by the head 2 and passes through the loop 17. The free end of the cable is attached to a float 21 associated with a small remote-controlled thruster 22.

Initially, the maximum possible length of hawser 15 is retracted into the tower and the greatest possible length of cable 19 is wound onto the winch 20, the assembly 21, 22 being suspended from the end of this cable (FIG. 1).

Upon the vessel 4 having reached the distance selected for the beginning of the mooring operations, the winch 20 is remotely actuated to pay out the cable 19.

When the assembly 21, 22 floats on the sea, it is remotely actuated from the vessel so as to move it closer to the latter (FIG. 2), at the same time as the corresponding end of the cable 19, being paid out and passing through the loop 17.

When the assembly 21, 22 is sufficiently near the vessel, it is picked up by means of a grapnel or the like whereupon it is separated from the cable and the latter is pulled from the vessel by any suitable means.

At about the time when the unwinding of the cable 19 is begun, a bulge or like protuberance 23 formed in the cable near the loop 17 in a manner such that it is too large to pass through the loop engages the same. The pull exerted on the cable from the vessel thereby results in dragging the hawser towards the vessel and, therefore, the end 13*b* of the rope 13 (FIG. 3) at the same time, the upstream length of the cable 19 continues to be paid out from the winch 20 in a parallel direction to the hawser 15.

When the loop 17 of the hawser arrives on the vessel, the rope end 13*b* is detached and the hawser is fixed to a special winch. The vessel is thereafter moved closer to the tower in a manner known per se by a pull exerted on the hawser until the connecting element 9 is located below the connecting element 12.

At the same time, the end 13*b* of the rope 13 is attached to the connecting element 9. When the two elements 9 and 12 are positioned substantially vertically opposite one another, the winch 14 is remotely operated to exert an upward pull on the end 13*b* of the rope and to thus lift the connecting element 9 together with the hose-pipe 6 until the desired fluid-tight connection between the elements 9 and 12 (FIG. 4) is established.

The transfer of the hydrocarbon compound from the tower to the vessel can now be effected through the hose-pipe 6.

It should be noted that during this transfer the level of the vessel prow may vary with respect to that of the end 5 of the boom 3. This variation is accommodated by the length of the emerging vertical portion of the hose-pipe 6 itself simultaneously varying with a high degree of resiliency owing to the above-mentioned resilient drawback of the pulley. A lowering of the vessel prow similarly results in an automatic and instant slight paying out of the hose-pipe, whereas on the other hand a rising of the said prow immediately results in a rewinding of the hose-pipe.

The second manner of mooring is somewhat simpler than the first one described above. However, this second mooring method requires that the vessel sufficiently approach the tower under its own power such that its prow is moved to a location below the end 5 of the boom 3. This condition is generally easy to accomplish since, on the one hand, the boom 3 has a considerable height and length (the end 5 of the latter being frequently at more than 30 m from the sea level and more than 50 m from the axis of the tower) and, on the other hand, the provision of bow thrusters on modern vessels.

This mooring method, illustrated in FIG. 5, simply uses, among the above-mentioned elements 15 to 22, the hawser 15 which is drawn by a counter-weight 16 into the tower and emerges therefrom through a trumpet or like device 18.

In this case, however, the hawser is provided, in lieu of the loop 17, with a bulge or like protuberance 15*a* which prevents it from re-entering the tower, while the hawser is elongated externally by an external length 15*b*. The length 15*b* extends beyond the bulge 15*a* to a location in proximity to the connecting element 12 where it is attached to the hanging length 13*b* of the rope 13, which is acted upon by a weight 24.

Under such conditions the mooring steps are quite simple. As soon as the vessel prow is located under the boom, the winch 14 is remotely actuated from the vessel so as to lower the weight 24 onto the vessel deck, the weight dragging along the corresponding ends of the rope 13 and the hawser 15.

As soon as these ends reach the vessel, the mooring and connecting operations are easy to carry out according to the method described above.

A form of embodiment of the complementary connecting elements 9 and 12 will now be described with reference to FIG. 10.

The connecting element 12 is located at the end 5 of the boom 3 comprises a rotor chamber 25 connected externally to the hydrocarbon supply conduit (seen at 45) of the tower. The chamber 25 communicates through an annular central orifice 26 with a coaxial cavity 27 defined by a cylindrical surface. A vertically sliding plug 28 having a solid cylindrical wall 29 is provided with an upper plate or flange 30 projecting transversely beyond the said wall is mounted in the cavity 27. The plate 30 is provided at its center with a hole 31 through which the rope 13 passes with a clearance.

Under normal conditions, i.e. prior to the connection of connecting elements 9 and 12, the plug 28 is urged by its own weight and possibly by complementary compression springs 32 towards a lower position illustrated in FIG. 8 in which the edges of plate 30 rest upon the upper edges of the cavity 27 whereas its wall 29 extends radially opposite the orifice 26. A fluid-tightness between this wall and the edges of this orifice is ensured by an O-ring or like seals 33.

This connecting element 9 mounted at the upper end of the hose-pipe 6 is in the form of a rigid cylindrical body 34, the outer diameter of which is slightly smaller than the inner diameter of the cavity 27. The body 34 has a lower axial vertical bore 35 extending in prolongation of the tubular cavity of the hose-pipe 6 and is connected at its upper end to at least one horizontal passage 36 leading radially outside the body and adapted to cooperate with the annular orifice 26. The top of the body 34 is provided with a ring 37 into which a suitable hook 38 provided at the lower end of the length 13*b* of the rope 13 can be engaged, the hook being surmounted by a pellet or disc 39 larger in cross-section than the hole 31. The bottom of connecting element 9 is provided with a flange 40 secured, e.g. bolted, on a counter-flange 41 provided at the end of the hose-pipe 6.

In order to facilitate the entrance of the connecting element 9 into the element 12, the latter is provided at its bottom with a frusto-conical skirt or bell 44 and the top of the body 34 is provided with a tapering shape towards its ring 37.

It is readily understood that the connecting elements 9 and 12 can be automatically assembled together by a simple lifting of the former by means of the rope 13. More particularly, the moment the upwardly moving pellet 39 contacts the lower face of plate 30, the plug 28 is progressively withdrawn from the orifice 26 and is immediately replaced opposite this orifice by the element 9 until the horizontal passages 36 are in confronting relationship to the rotor chamber 25. The accuracy of this confronting position is defined by the axial abutment of appropriate bearing surfaces 42, 43 provided on the elements 9 and 12, respectively. It should be noted that the pressure of the hydrocarbon to be transferred itself insures a reliable application of the bearing surfaces 42 and 43 against one another, owing to the upward force which it exerts on those internal faces of the passages 36 that are located right above the bore 35.

In order to disconnect the connecting element 9, it is only necessary to lower the same by unwinding the rope 13 from the winch 14. As soon as this element is removed from the cavity 27, the plug 28 takes its place and again obturates the downstream end of the supply conduit of the tower.

In order to void any discontinuity between the stage of obturation of the orifice 26 by the plug 28 and the stage of connection of this orifice to the passages 36 of the body 34, it is sufficient to design the entire assembly in a manner such that the outer cylindrical faces of the plug and the body, which are arranged in axial prolongation of one another, are juxtaposed in mutual contact during the vertical displacement of the plug. To this end, the plug 28 and the body 34 may be provided with respective complementary annular bearing surfaces radially prolonging said cylindrical faces towards their common axis and adapted to come into mutual contact during the upward engagement of the body 34 into the cavity 27. Such mutual contact replaces the above-mentioned contact between the pellet 39 and the plate 30 for the purpose of lifting the plug 28.

It is seen from the foregoing that according to the present invention, apparatus is provided for the connection of an oil-tanker to a marine tower, whose structure, use and advantages, particularly the absence of permanent exposure of any flexible member or hose-pipe to weather conditions result from the foregoing.

It is understood that the invention is by no means limited to those forms of application and embodiments which have been particularly described herein. On the contrary, it includes all modifications, particularly those in which the equipment disclosed may be used for purposes other than the loading of a vessel with hydrocarbon from a marine tower or column, such for example, as the supply of the tower or column from the vessel with sea water, for ballasting or cleaning purposes, or for purposes of vessel unloading. The equipment carried by the tower in the embodiments disclosed above can be thus carried by a wharf or quay crane. Apparatus of the kind disclosed above but comprising hose-pipes smaller in diameter can also be used to supply a marine tower or column from a vessel with a consumable liquid such as soft water or fuel oil.

What is claimed is:

1. A device for fluidly connecting a tanker to a marine tower having a boom freely pivotable on said tower about the longitudinal axis thereof, said boom being vertically stationary relative to said tower, for transferring fluid between said tower and said tanker, comprising: means for mooring said tanker to said tower and means for connecting a fluid supply conduit mounted on said tower to a fluid receiver conduit mounted on said tanker including a flexible hose-pipe stored on said tanker, said mooring means including a mooring hawser having one end coupled to said tower adapted to be at least partially retractable in said tower and having another end adapted to be attached to said tanker, said connecting means including first and second connecting elements fluidly connectable to one another by relative displacement towards one another, said second connecting element being mounted on the end of said boom, and coupled to the downstream end of said fluid supply conduit of said tower in such a manner that its opening is directed downwardly, said first connecting element being connected to one end of said hose-pipe, a rotary pulley mounted on said tanker at least partially receiving said hose-pipe such that the end of the hose-pipe provided with said first connecting element opens upwardly in the tanker deck even when the hose-pipe is in stored position, the other end of said hose-pipe being connected to said fluid receiver conduit, and a rope passing vertically through said second connecting element having one end attached to an actuating winch mounted on said tower and another end which in its rest position is suspended from the end of said boom and which is adapted to be transferred to said tanker and attached to an attachment member provided on the the top of said first connector element and to move said first connecting element vertically either towards or away from said second connecting element upon actuation of said winch.

2. A device according to claim 1, wherein said pulley is rotatably mounted about a shaft provided fixedly on said tanker and said connection of the said other end of said hose-pipe of said receiver conduit of said tanker is constituted by a rotary joint coaxial with the axis of the shaft of said pulley.

3. A device according to claim 2, wherein said pulley is resiliently biased in a direction tending to wind said hose-pipe thereon.

4. A device according to claim 2, wherein said pulley has a diameter sufficiently large so that only a single turn of said hose-pipe is received thereon when said hose-pipe is fully retracted.

5. A device according to claim 1, wherein said second connecting element comprises an obturating member through which said rope passes vertically and said member being biased at least by its own weight towards a lower position in which it obturates the downstream end of said supply conduit of said tower, connection between said two connecting elements due to the upward pull exerted on the end of said rope attached to said first element, resulting in a lifting of said obturating member and removing it from its obturating position to allow fluid to communicate between said fluid supply conduit and the receiver conduit.

6. A device according to claim 5, wherein said second connecting element comprises a annular chamber opening and communicating with the downstream end of the fluid supply conduit of said tower, wherein said first connecting element comprises a cylindrical body provided with at least one radially extending passage adapted to co-operate with said annular opening, and said obturating member comprises a cylindrical sleeve locatable against the edges of said annular opening, with sealing means interposed therebetween when said elements are connected.

7. A device according to claim 6, wherein said attachment member is provided at the top of said cylindrical body of said first connecting element.

8. A device according to claim 7, wherein said hook-like member being provided with an upper plate member adapted to abut against an abutment face of said obturating member, said obturating member being lifted following abutment of the abutment face thereon by said upper plate member.

9. A device according to claim 1, wherein the axis of said pulley is substantially parallel to said tanker deck.

10. A device according to claim 9, wherein said pulley is disposed within the tanker prow.

11. A device according to claim 9, wherein said pulley is mounted on a cradle disposed on said tanker deck.

12. A device according to claim 1, wherein the axis of said pulley is substantially perpendicular to said tanker deck and a bent guide is provided at said tanker prow such that said first connecting element is directed upwardly even in its stored position.

13. A device according to claim 1, wherein the end of said hawser which is intended to be attached to said tanker being, in rest position, connected to the end of said rope suspended from the end of said boom.

14. A device according to claim 13, wherein the end of said hawser which is intended to be attached to said tanker ends with an eye and there is provided a cable passing through said eye and one end of which is attached to an actuating winch provided on said tower whereas its other end is connected to a float which is associated with a remotely controllable thruster, said cable presenting a enlarged portion too large to pass through said eye, the length of said cable defined between said float and said portion being greater than a predetermined maximum distance between said tower and said tanker at the initiation of mooring operations.

15. A device for fluidly connecting a tanker to a marine tower having a boom freely pivotable on said tower about the longitudinal axis thereof for transferring fluid between said tower and said tanker, comprising: means for mooring said tanker to said tower and means for connecting a fluid supply conduit mounted on said tower to a fluid receiver conduit mounted on said tanker including a flexible hose-pipe stored on said tanker, said mooring means including a mooring hawser having one end coupled to said tower adapted to be at least partially retractable in said tower and having another end adapted to be attached to said tanker, said connecting means including first and second connecting elements fluidly connectable to one another by relative displacement towards one another, said second connecting element being mounted on the end of said boom, and coupled to the downstream end of said fluid supply conduit of said tower in such a manner that its opening is directed downwardly, a pulley mounted on said tanker as a simple idler pulley adapted to receive a hose-pipe portion extending along substantially one half of its periphery between an upstream rectilinear hose-pipe length and a downstream rectilinear hose-pipe length, said hose-pipe lengths extending substantially in a parallel relationship to one another, said first connecting element being connected to the end of said upstream hose-pipe length and opening upwardly, and means for urging said pulley to move in the direction substantially parallel to said rectilinear hose-pipe lengths away from said receiver conduit, said other end of said hose-pipe constituting the downstream end of said downstream length being connected to said receiver conduit, and a rope passing vertically through said second connecting element having one end attached to an actuating winch mounted on said tower and another end which in its rest position is suspended from the end of said boom and which is adapted to be transferred to said tanker and attached to said first connector element and to move said first connecting element vertically either towards or away from said second connecting element upon actuation of said winch.

16. A device for fluidly connecting a tanker to a marine tower having a boom freely pivotable on said tower about the longitudinal axis thereof said boom being vertically stationary relative to said tower for transferring fluid between said tower and said tanker, comprising: means for mooring said tanker to said tower and means for connecting a fluid supply conduit mounted on said tower to a fluid receiver conduit mounted on said tanker including a flexible hose-pipe stored on said tanker, said mooring means including a mooring hawser having one end coupled to said tower adapted to be at least partially retractable in said tower, and having another end adapted to be attached to said tanker, said connecting means including first and second connecting elements fluidly connectable to one another by relative displacement towards one another, said second connecting element being mounted on the end of said boom and coupled to the downstream end of said fluid supply conduit of said tower in such a manner that its opening is directed downwardly, said first connecting element being connected to one end of said hose-pipe, a rotary pulley mounted on said tanker at least partially receiving said hose-pipe such that the end of the hose-pipe provided with said first connecting element opens upwardly in the tanker deck even when the hose-pipe is in stored position, the other end of said hose-pipe being connected to said fluid receiver conduit, and a rope passing vertically through said second connecting element having one end attached to an actuating winch mounted on said tower and another end which in its rest position is suspended from the end of said boom and which is adapted to be transferred to said tanker, said another end of said rope carrying and the hook-receiving member being mounted on the top of said first connecting element for enabling attachment of said another end of said rope to said first connector element and moving said first connecting element vertically either towards or away from said second connecting element upon actuation of said winch.

* * * * *

UNITED STATES PATENT AND TRADEMARK OFFICE
CERTIFICATE OF CORRECTION

PATENT NO. : 4,206,782

DATED : June 10, 1980

INVENTOR(S) : Samuel Tuson

It is certified that error appears in the above-identified patent and that said Letters Patent are hereby corrected as shown below:

[73] assignee: should read

-- ENTREPRISE D'EQUIPEMENTS MECANIQUES ET HYDRAULIQUES E.M.H. --.

Signed and Sealed this

*Twenty-third* Day of *December 1980*

[SEAL]

*Attest:*

SIDNEY A. DIAMOND

*Attesting Officer* *Commissioner of Patents and Trademarks*